(12) United States Patent
Takahara et al.

(10) Patent No.: US 8,961,095 B2
(45) Date of Patent: Feb. 24, 2015

(54) ARTICLE STORAGE SYSTEM AND MAINTENANCE METHOD IN ARTICLE STORAGE SYSTEM

(71) Applicant: Daifuku Co., Ltd., Osaka (JP)

(72) Inventors: Fumio Takahara, Komaki (JP); Shinsuke Kawamura, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 246 days.

(21) Appl. No.: 13/716,787

(22) Filed: Dec. 17, 2012

(65) Prior Publication Data
US 2014/0003894 A1   Jan. 2, 2014

(30) Foreign Application Priority Data
Dec. 21, 2011 (JP) ................... 2011-280178

(51) Int. Cl.
| | | |
|---|---|---|
| *B66F 9/075* | (2006.01) | |
| *B65G 1/04* | (2006.01) | |
| *B60S 11/00* | (2006.01) | |
| *B66F 9/08* | (2006.01) | |
| *B66F 9/07* | (2006.01) | |

(52) U.S. Cl.
CPC .............. *B65G 1/0407* (2013.01); *B66F 9/075* (2013.01); *B66F 9/08* (2013.01); *B60S 11/00* (2013.01); *B65G 1/0428* (2013.01); *B65G 1/0492* (2013.01); *B66F 9/07* (2013.01)
USPC ........ 414/284; 29/402.03; 29/426.3; 414/279

(58) Field of Classification Search
CPC .............. B66F 9/07; B66F 9/08; B66F 9/075; B65G 1/0407; B65G 1/0428; B65G 1/0492; B60S 11/00

USPC ............... 29/402.03, 402.01, 426.3; 414/279, 414/281, 282, 284
See application file for complete search history.

(56) References Cited

U.S. PATENT DOCUMENTS

| | | | | |
|---|---|---|---|---|
| 2,652,938 | A * | 9/1953 | Murphy ........................ | 414/661 |
| 3,612,304 | A * | 10/1971 | Troth ............................. | 414/284 |
| 3,632,001 | A * | 1/1972 | Richens et al. ................ | 414/661 |
| 3,779,403 | A * | 12/1973 | Young ........................... | 414/279 |
| 3,800,963 | A * | 4/1974 | Holland ........................ | 414/279 |
| 3,817,406 | A * | 6/1974 | Sawada et al. ................ | 414/279 |
| 4,026,432 | A * | 5/1977 | Abels ............................ | 414/635 |
| 4,265,582 | A * | 5/1981 | Theobald ...................... | 414/279 |
| 4,286,911 | A * | 9/1981 | Benjamin ..................... | 414/273 |
| 4,316,528 | A * | 2/1982 | Dechantsreiter ............. | 187/235 |
| 7,762,754 | B2 * | 7/2010 | Maetaki ........................ | 414/281 |
| 7,955,044 | B2 | 6/2011 | Moriya et al. | |
| 2008/0089765 | A1 | 4/2008 | Moriya et al. | |

FOREIGN PATENT DOCUMENTS

| | | |
|---|---|---|
| JP | 6213216 A | 8/1994 |
| JP | 200868963 A | 3/2008 |
| JP | 200874545 A | 4/2008 |

* cited by examiner

*Primary Examiner* — David Bryant
*Assistant Examiner* — Jason L Vaughan
(74) *Attorney, Agent, or Firm* — The Webb Law Firm

(57) ABSTRACT

A traveling body of a stacker crane is separable into a lower traveling portion and an upper traveling portion by separating a post into a lower post portion and an upper post portion, in which the lower traveling portion in a separated state separated from the upper traveling portion and supporting a lift body is moved in a width direction with its traveling posture being maintained to be taken in or out between a moving space and a take-in/out space.

9 Claims, 5 Drawing Sheets

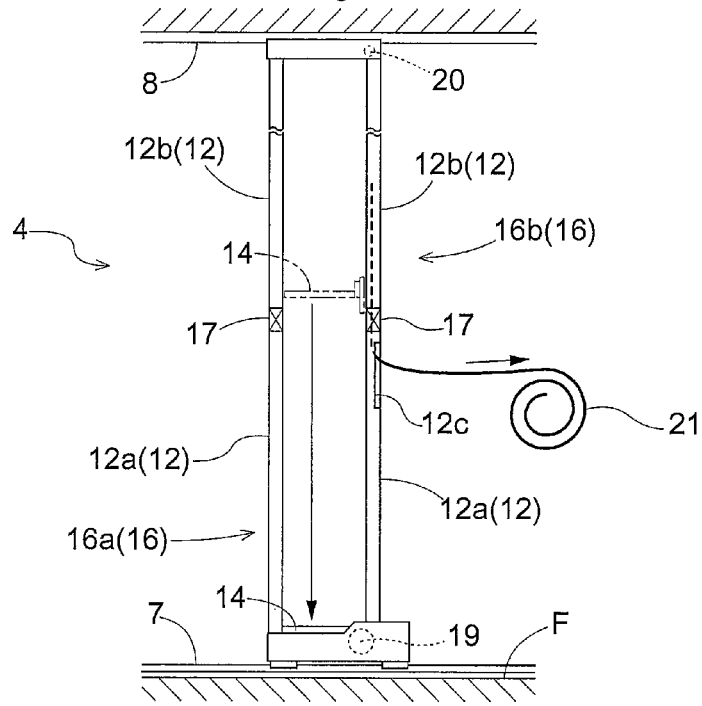
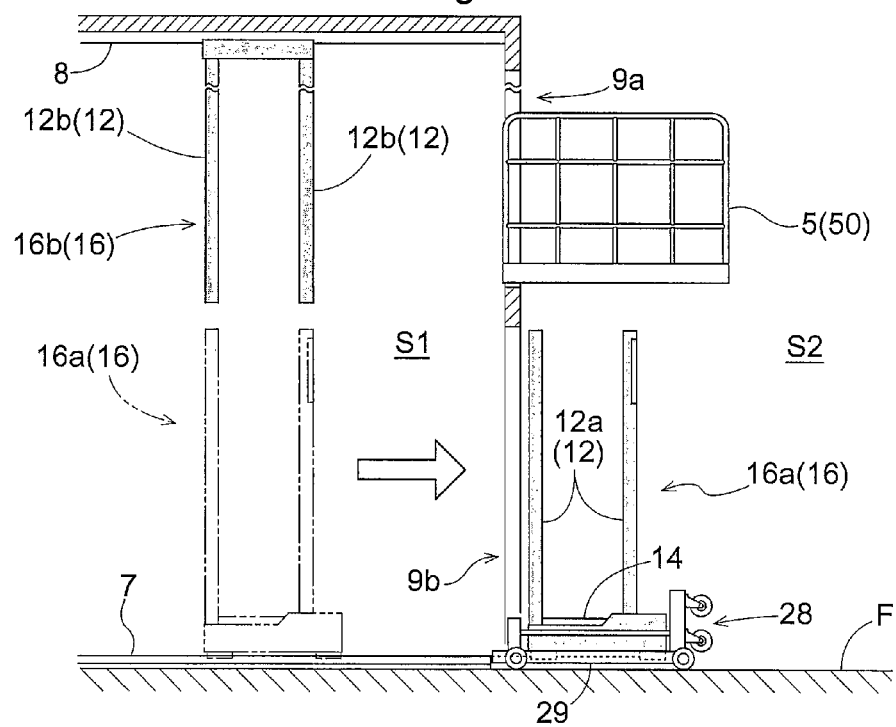

ARTICLE STORAGE SYSTEM AND MAINTENANCE METHOD IN ARTICLE STORAGE SYSTEM

FIELD OF INVENTION

The present invention relates to an article storage system and a maintenance method in the article storage system.

BACKGROUND

An article storage system is known which includes a pair of article storage shelves facing each other and a stacker crane traveling in a moving space formed between the pair of article storage shelves for transporting an article. In such an article storage system, an attached apparatus may be mounted in the vicinity of one side of the moving space in a width direction at a predetermined level lower than the stacker crane. As the attached apparatus, a transport device may be provided for supplying or delivering the article to/from an upper part of the article storage system, or a platform may be provided for the operator to access the upper part of the moving space from one side of the moving space in the width direction (first end side of a transverse direction) for maintenance work, for example.

Japanese Unexamined Patent Application Publication No. 2008-068963 (Patent Document 1) discloses an example of the above-noted article storage system, in which the transport device acting as the attached apparatus is provided for supplying or delivering the article to/from the upper part of the article storage system.

In the article storage system disclosed in Patent Document 1, the maintenance work for the stacker crane, if minor like inspection, can be performed with the stacker crane being positioned in the moving space. On the other hand, it is difficult for the operator to perform the maintenance work with the stacker crane being positioned in the moving space if some major maintenance work has to be done including exchange of a propelling motor for propelling a traveling carriage, exchange of a lifting motor for raising or lowering a lift deck, or exchange of the lift deck, for example. Thus, the stacker crane should be moved along a longitudinal direction of the moving space and carried out from the moving space to perform the maintenance work in the outside of the moving space, and then returned or carried in to the moving space after the maintenance work is completed.

In the article storage system as disclosed in Patent Document 1, if the other side of the moving space in the longitudinal direction (a second end side of the transverse direction opposite to the first end side of the transverse direction) is blocked with a pillar of a structure building, or equipment or a device provided in its vicinity, for example, the stacker crane cannot be carried out to the outside from the other side of the moving space in the longitudinal direction. As a result, the stacker crane should be carried out to the outside from the first end side of the transverse direction in such an article storage system. In that case, however, the attached apparatus is mounted in the vicinity of the first end side of the moving space in the transverse direction as noted above at a level lower than the stacker crane, which prevents the stacker crane from being carried out from the moving space if the attached apparatus is mounted. Hence, the attached apparatus has to be removed before the stacker crane is carried out from the first end side of the moving space in the transverse direction. Further, it is necessary to mount the attached apparatus in the system after the stacker crane is returned or carried in from the first end side of the moving space in the transverse direction, which requires much time and effort for carrying in or out the stacker crane from the moving space and makes it difficult for the operator to perform the maintenance work for the stacker crane that requires a large space.

SUMMARY OF INVENTION

In view of the above-noted background, an article storage system for facilitating maintenance work that requires a large space and a maintenance method in such an article storage system have been desired.

One of the characteristic features of the article storage system according to the present invention lies in comprising an article storage shelf including a plurality of storage portions arranged in a vertical direction and a width direction; a stacker crane moving and traveling between a moving space defined between a pair of the article storage shelves facing each other for transporting an article; and an attached apparatus provided at a predetermined level adjacent to one side of the moving space in the width direction, wherein the stacker crane includes a traveling body having a traveling carriage guided by a floor rail laid on a floor to move and travel along the width direction and a post mounted upright on the traveling carriage, and a lift body supported and guided by the post to be vertically movable along the post; the lift body is configured to support a transfer device for transferring the article relative to the storage portion; the post has a dividable structure that is separable into a lower post portion and an upper post portion and connectable to each other at a level lower than the predetermined level; the traveling body is separable into a lower traveling portion and an upper traveling portion by separating the post into the lower post portion and the upper post portion; and the lower traveling portion in a separated state separated from the upper traveling portion and supporting the lift body is moved in the width direction with its traveling posture being maintained to be taken in or out between the moving space and a take-in/out space adjacent to the one side of the moving space in the width direction.

More particularly, the traveling body of the stacker crane is separable into the lower traveling portion and the upper traveling portion by separating the post of the stacker crane into the lower post portion and the upper post portion. Since the position where the lower post portion is separated from the upper post portion is at the level lower than the predetermined level at which the attached apparatus is mounted, the level of the lower traveling portion in the separate state separated from the upper traveling portion is lower than the predetermined level at which the attached apparatus is mounted. Therefore, the lower traveling portion in the separated state is movable under the attached apparatus with its traveling posture being maintained, as a result of which the lower traveling portion in the separated state can be taken in or out through the underside of the attached apparatus between the moving space and the take-in/out space adjacent to the one side of the moving space without detaching the attached apparatus.

Incidentally, possible maintenance work that requires a large space includes replacement of a propelling motor for propelling the traveling carriage or a lifting motor for raising or lowering the lift body. Since those propelling motor and the lifting motor are provided in or in the vicinity of the traveling carriage, the lower traveling portion is conveyed from the moving space to the take-in/out space, and the propelling motor and lifting motor also can be conveyed to the outside of the moving space along with the lower traveling portion. Thus, the replacement of the propelling motor or lifting motor can be done easily. The possible maintenance work that requires a large space also includes replacement of the lift body. When the lower traveling portion in the separated state is conveyed from the moving space to the take-in/out space with the lift body being supported, the lift body also can be conveyed to the outside of the moving space along with the lower traveling portion. Thus, the lift body also can be replaced easily.

With the characteristic arrangement of the present invention, the lower traveling portion in the separated state supporting the lift body is carried out from the moving space to the take-in/out space through the underside of the attached apparatus, which allows the operator to perform the maintenance work that requires a large work space as noted above in the outside of the moving space.

With the characteristic arrangement of the present invention, even if the other side of the moving space in the longitudinal direction is blocked with a pillar of a building structure, for example, and the stacker crane cannot be carried out to the outside from the other side of the moving space in the longitudinal direction, and wherein the article storage system is configured to move the work carriage to the take-in/out space with the carriage rail continuing from an end of the floor rail to allow the lower traveling portion to move from the moving space to the take-in/out space. Thus, the attached apparatus needs not be detached before the stacker crane is carried out from one side of the moving space to the outside, and needs not be attached after the stacker crane is carried in from one side of the moving space in the longitudinal direction. As a result, the operation for carrying in or out the stacker crane from the moving space can be simplified, thereby to allow the operator to easily perform the maintenance work that requires a large work space.

BRIEF DESCRIPTION OF DRAWINGS

FIG. 5 is an exploded functional view of the stacker crane;
and
FIG. 6 is another exploded functional view of the stacker crane.

DETAILED DESCRIPTION

Figure 1:
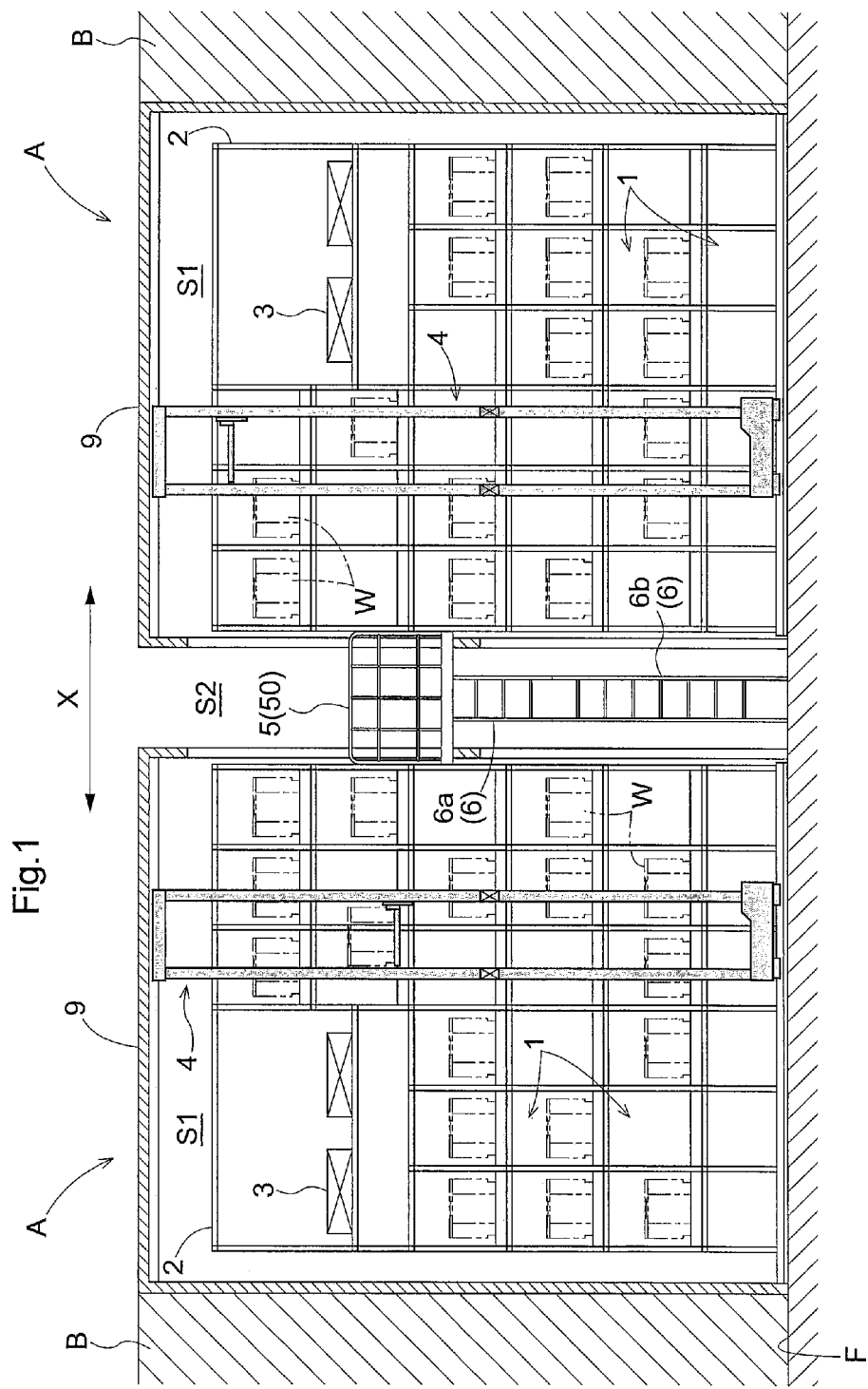
FIG. 1 is a side view of an article storage system.
Figure 2:
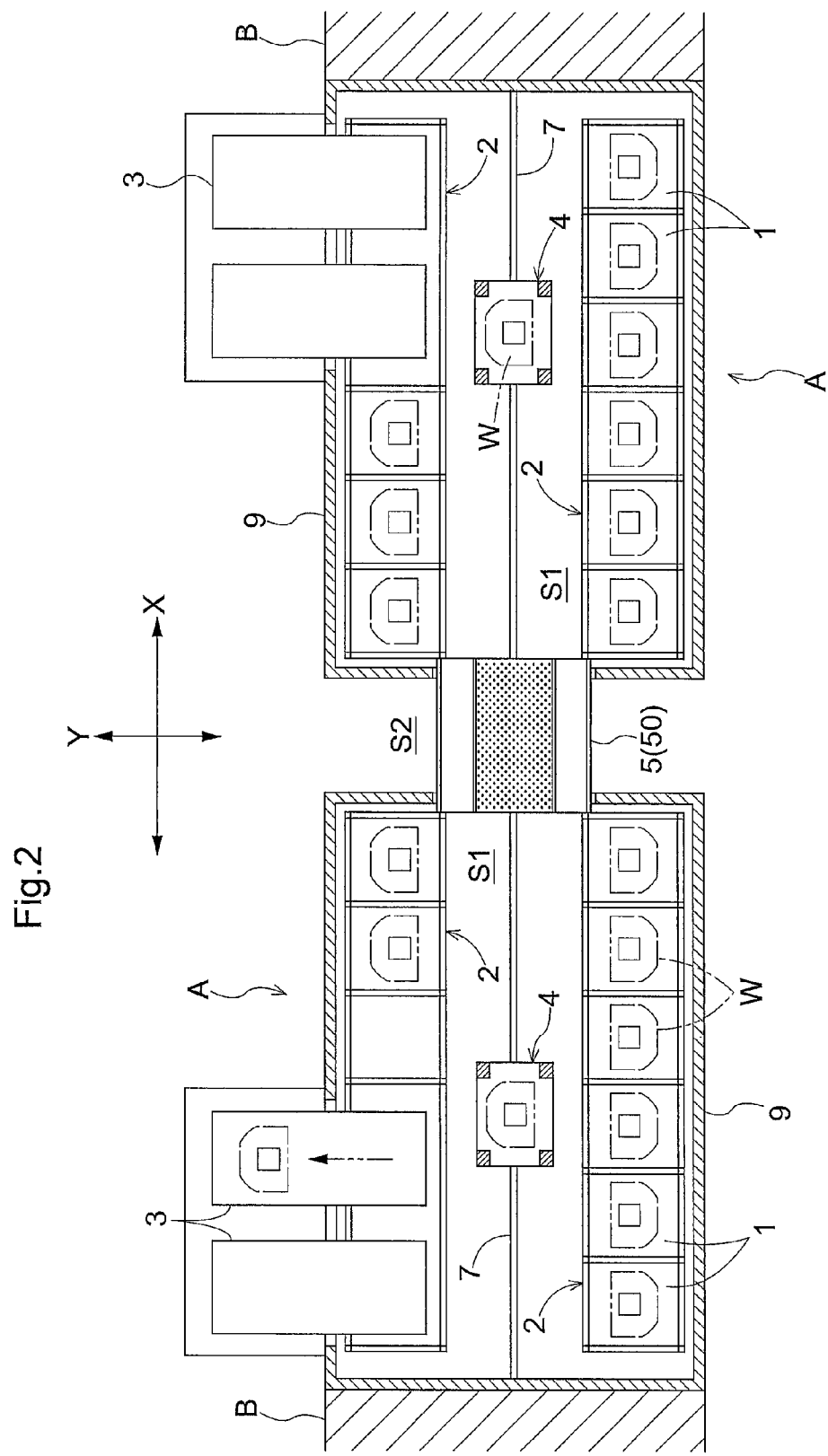
FIG. 2 is a top plan view of the article storage system.
Figure 3:
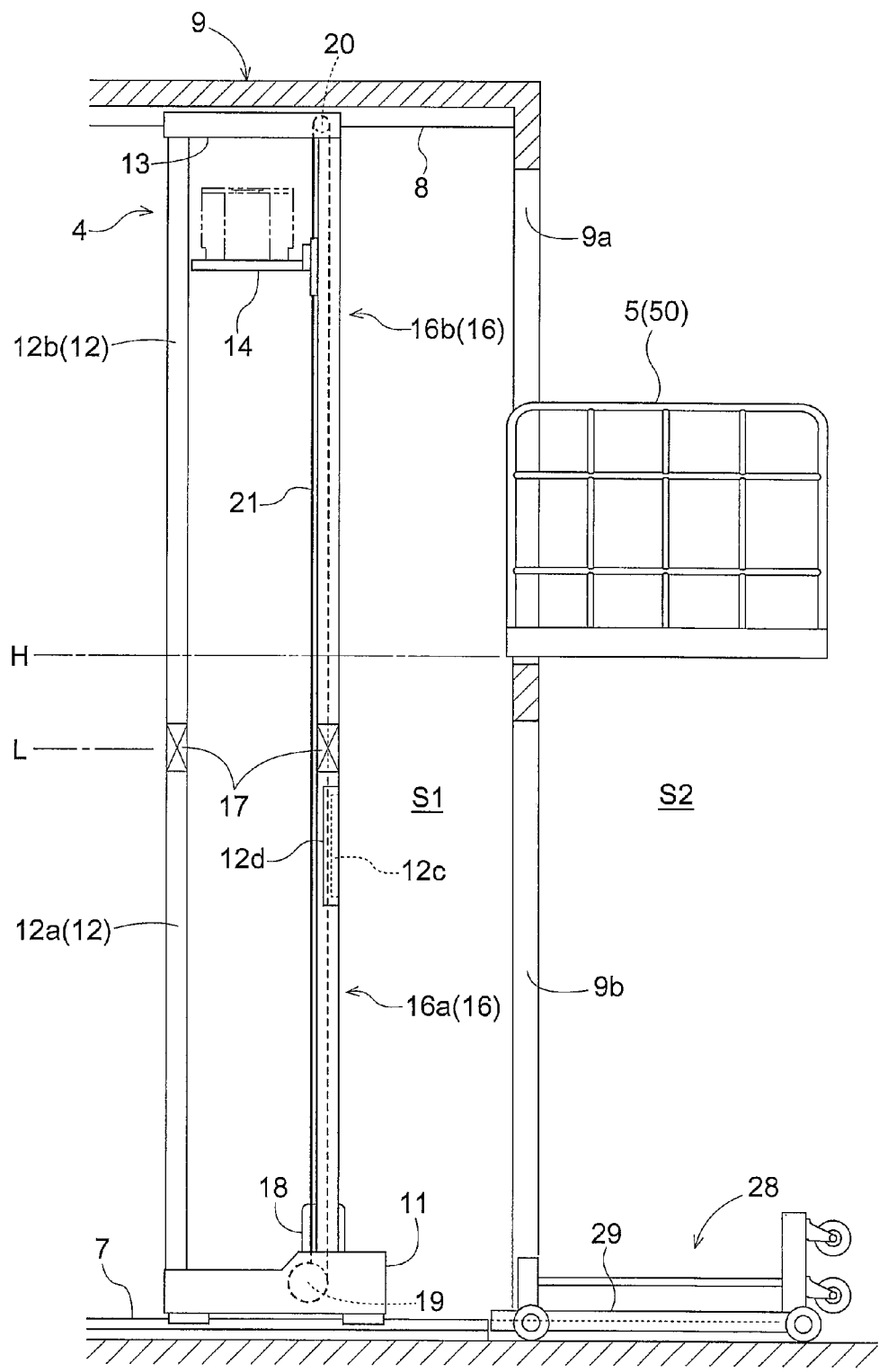
FIG. 3 is a side view of a stacker crane.
Figure 4:
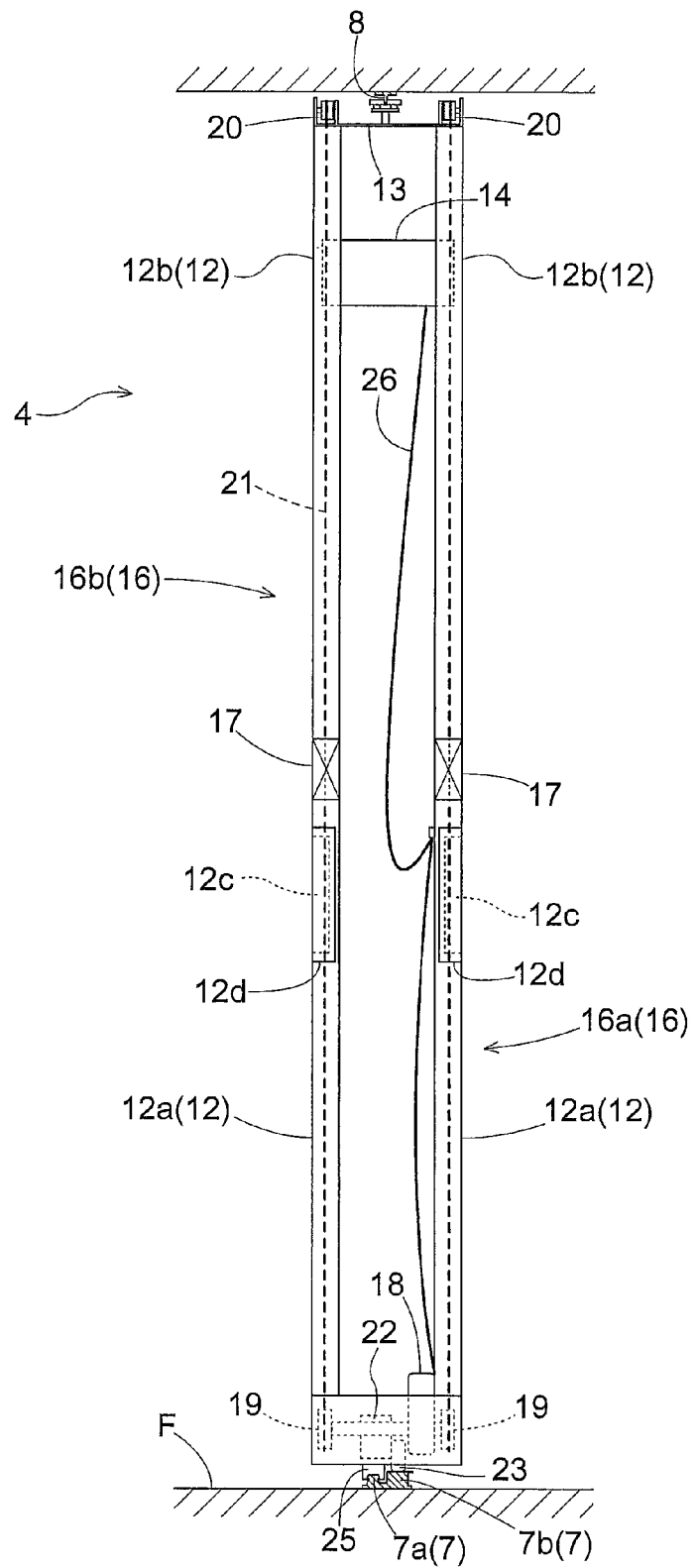
FIG. 4 is a front view of the stacker crane.

An embodiment of an article storage system according to the present invention will be described hereinafter in reference to the accompanying drawings. As shown in FIGS. 1 and 2, the article storage system includes a plurality of storage portions 1 arranged in a vertical direction and a width direction in an article storage shelf 2, a transport device 3 for stock and delivery of an article, a stacker crane 4 for transferring the article between the storage portion 1 and the transport device 3, and a platform 5 for the operator to access an upper part (upper space) of a moving space 51 for the stacker crane 4 from one side of the width direction (first end side of a transverse direction). FIG. 1 is a side view of the article storage system in vertical section, in which the width direction of the article storage shelf 2 is shown in arrow X. FIG. 2 is a top plan view of the article storage system, in which the width direction of the article storage shelf 2 is shown in arrow X while a fore-and-aft direction of the article storage shelf 2 is shown in arrow Y.

An automated warehouse A is formed by the article storage shelf 2, transport device 3, stacker crane 4 and platform 5. A pair of article storage shelves 2 facing each other are provided in the automated warehouse A. The stacker crane 4 travels and moves in a moving space S1 formed between the pair of article storage shelves 2 along a longitudinal direction thereof for transferring the article between the article storage portion 1 of the article storage shelf 2 and the transport device 3 provided in an upper portion of the article storage shelf 2.

A pair of automated warehouses A are juxtaposed to each other in the width direction of the article storage shelf 2 between a pair of pillars B of a structure building. Each of the pair of automated warehouses A is provided in the vicinity of the pillar B on the same side. More particularly, the left-side automated warehouse A is provided in the vicinity of the left pillar B while the right-side automated warehouse A is provided in the vicinity of the right pillar B.

The platform 5 acting as an attached apparatus 50 is provided in a space defined between the pair of automated warehouses A for the operator to enter the moving space S1 from the one side of the width direction (first end side of the transverse direction). The platform 5 is connected to the article storage shelf 2 of one of the automated warehouses A and the article storage shelf 2 of the other of the automated warehouses A. More particularly, the platform 5 is provided at a level H adjacent to one side of the moving space S1 in the longitudinal direction (same as the width direction of the article storage shelf 2), in which the right side of the moving space S1 of the automated warehouse A positioned in the left side in FIGS. 1 and 2 acts as the one side of the width direction (first end side of the transverse direction) while the left side of the moving space S1 of the automated warehouse A positioned in the right side in FIGS. 1 and 2 acts as the one side of the width direction (first end side of the transverse direction). The operator can enter either of the moving spaces S1 of the pair of automated warehouses A from the platform 5. In other words, a single platform 5 is provided for the pair of automated warehouses A to be used in common.

The platform 5 is provided with a ladder 6 for the operator to climb up or down. The ladder 6 has a fixed ladder portion 6a supported and connected to the platform 5 and a removable ladder portion 6b detachable from the fixed ladder portion 6a. The removable ladder portion 6b attached to the fixed ladder portion 6a is supported to the fixed ladder portion 6a and a floor F. A mark is provided in the floor F where the removable ladder portion 6b is supported to indicate the position where the removable ladder portion 6b should stand against the floor F.

Although any detailed description on a connecting structure between the platform 5 and the article storage shelf 2 will be omitted here, it should be noted that the platform 5 is connected to each of the article storage shelves 2 of the pair of automated warehouses A through a fastening member having a bolt and nut. More particularly, holes are formed in the article storage shelf 2 and the platform 5, through which the bolt extends to be fastened, thereby to connect the platform 5 to the article storage shelf 2. While each hole of the article storage shelf 2 of one of the automated warehouses A has a size corresponding to a diameter of a bolt shank, each hole of the article storage shelf 2 of the other of the automated warehouses A has a size larger than the diameter of the bolt shank taking a tolerance into account to have a larger diameter than the hole formed in the one of the automated warehouses A. Since the holes for connecting the platform 5 are formed in this manner, even if an installation error occurs in any of the article storage shelves 2, such an installation error is absorbed to connect the platform 5 to the article storage shelves 2 of the pair of automated warehouses A, respectively.

Thus, the platform 5 is mounted at the predetermined level H, being adjacent to the one side of the width direction (first end side of the transverse direction) of the moving space S1, which allows the operator to access the upper part of the moving space S1 from the first end side of the transverse direction and easily perform the maintenance work for a high portion of any of the article storage shelves 2. As described in detail later, a traveling body 16 of the stacker crane 4 is separable into a lower traveling portion 16a and an upper traveling portion 16b. Therefore, the lower traveling portion 16a of the stacker crane 4 is movable between the moving space S1 and a take-in/out space S2 without removing the platform 5, if attached. Thus, the maintenance work for the stacker crane 4 that requires a large working space can be easily performed.

Each automated warehouse A has a peripheral wall 9 covering the surroundings of the pair of article storage shelves 2. The pair or article storage shelves 2 and the stacker crane 4 are positioned in the inside of the peripheral wall 9, the platform 5 is positioned in the outside of the peripheral wall 9, and the transport device 3 is positioned between the inside and the outside of the peripheral wall 9. In a wall portion of the peripheral wall 9 positioned at the one side of the longitudinal direction of the moving space S1 (first end side of the transverse direction) are formed an access opening 9a for allowing the operator to access the upper part (upper space) of the moving space S1 and a taking in/out opening 9b for allowing the operator to access a lower part of the moving space S1 and also for taking in or out the lower traveling portion 16a of the stacker crane 16b. The access opening 9a is formed at a level higher than the predetermined level H at which the platform 5 is mounted, while the taking in/out opening 9b is formed at a level lower than the predetermined level H at which the platform 5 is mounted.

Each automated warehouse A is provided with a work table (not shown). While a detailed description for the work table is omitted, this work table is configured to be switchable between a folded position in which the work table is folded to the one side of the width direction (first end side of the width direction) of the moving space S1 and a developed position in which the work table is developed horizontally at the predetermined level H in the moving space S1. The work table is switched to the folded position when the stacker crane 4 is moved to transport the article, and is switched to the developed position when the operator enters the upper part (upper space) of the moving space S1.

Next, the stacker crane 4 will be described. The stacker crane 4 includes a traveling carriage 11 guided by a floor rail 7 laid in the floor and running and moving along the longitudinal direction of the moving space S1, a plurality of posts 12 mounted upright in the traveling carriage 11, a guided portion 13 guided by a ceiling rail 8 provided in a ceiling and connected between upper end portions of the plurality of posts 12, and a lift body 14 guided and supported so as to move vertically along the posts 12. A transfer device for transferring the article between the storage portion 1 of the article storage shelf 2 or the transport device 3 and the lift body is placed on and supported to the lift body 14.

The posts 12 are mounted upright on the traveling carriage 11 and the guided portion 13 is connected to the upper end portions of the posts 12 in this manner, which forms the traveling body 16 guided by the floor rail 7 and the ceiling rail 8 to run and move in the moving space S1 along the longitudinal direction thereof. Here, each post 12 has a dividable structure that is separable into a lower post portion 12a and an upper post portion 12b and connectable to each other at a separation level L lower than the predetermined level H. More particularly, each post 12 is separated into the lower post portion 12a and the upper post portion 12b, thereby to separate the traveling body 16 into the lower traveling portion 16a and the upper traveling portion 16b.

The lower post portion 12a and the upper post portion 12b are connected to each other by a connecting member 17. The connecting member 17 is configured to be fastened to the lower post portion 12a and the upper post portion 12b through a fastening element such as a bolt. When the fastening between the lower post portion 12a and the upper post portion 12b by the fastening element 17 is released, the lower post portion 12a is separated from the upper post portion 12b. On the other hand, when the lower post portion 12a and the upper post portion 12b are fastened together through the fastening element 17, the lower post portion 12a and the upper post portion 12b are connected to each other.

The traveling carriage 11 is provided with a lifting electric motor 18 and a drive pulley 19 that is rotatable in the forward direction and reverse direction by the lifting electric motor 18. The guided portion 13 is provided with a follower pulley 20 that is rotatable by following the rotation of the drive pulley 19 transmitted through a lifting belt 21. The lifting belt 21 wound around the drive pulley 19 and follower pulley 20 is connected to the lift body 14 from above at one end and connected to the lift body 14 from below at the other end. The drive pulley 19 is rotatably driven by the lifting electric motor 18 in the forward direction and reverse direction, as a result of which the lift body 14 connected to the lifting belt 21 is raised and lowered along the vertical direction.

The traveling carriage 11 is also provided with a propelling electric motor 22 and a propelling wheel 23 rotatably driven in the forward direction and reverse direction by the propelling electric motor 22. The propelling wheel 23 is configured to roll on the upper surface of the floor rail 7. The propelling wheel 23 is rotatably driven by the propelling electric motor 22 in the forward direction and reverse direction, as a result of which the traveling carriage 11 (lower traveling portion 16a) is running and moving on the floor rail 7 in the moving space S1 along the longitudinal direction thereof.

The floor rail 7 is provided along the longitudinal direction of the moving space S1. The floor rail 7 has a guiding portion 7a for guiding a guided member 25 mounted in the traveling carriage 11 and a traveling portion 7b on which the propelling wheel 23 of the traveling carriage 11 rolls. The guiding portion 7a is formed by a linear guide rail. The guided member 25 guided by the guiding portion 7a is formed by a guide block, and the traveling carriage 11 is linearly guided.

A cable 26 for power supply and information communication is provided between the traveling carriage 11 and the lift body 14. The cable 26 is configured to supply electric power from the traveling carriage 11 to the lift body 14 to allow transmission and receipt of information between the traveling carriage 11 and the lift body 14. The cable 26 is connected to the traveling carriage 11 at one end thereof, connected to the lift body 14 at the other end thereof, and supported only by the lower post portion 12a in an intermediate portion thereof.

The arrangement in which the intermediate portion of the cable 26 is supported by the post 12 prevents a load applied from the one end to the intermediate portion of the cable 26 (load applied to a side of the cable 26 connected to the traveling carriage 11) from acting on a connecting portion between the other end of the cable 26 and the lift body 14. More particularly, since the intermediate portion of the cable 26 is supported at the lower post portion 12a, the load of the cable 26 applied to the connecting portion between the cable 26 and the lift body 14 can be reduced. Further, since the intermediate portion of the cable 26 is supported only by the lower post portion 12a, not by the upper post portion 12b (the cable 26 is not supported by the upper traveling portion 16b), the cable 26 needs not be removed from the post 12 when the traveling body 16 is separated into the lower traveling portion 16a and the upper traveling portion 16b with the lift body 14 being placed on the lower traveling portion 16a. Thus, the operation for separating the stacker crane 4 can be simplified.

It should be noted that the state in which the lower traveling portion 16a is separated from the upper traveling portion 16b to support the lift body 14 is referred to as a "separated state." The lower traveling portion 16a in the separated state is moved in the width direction, maintaining the traveling posture, thereby to be movable between the take-in/out space S2 positioned adjacent to the one side of the moving space S1 in the width direction and the moving space S1.

To give an additional description, the separation level L at which the lower post portion 12a is separated from the upper post portion 12b is lower than the predetermined level H at which the platform 5 is mounted, and the vertical width of the lift body 14 is smaller than a gap between the upper surface of the traveling carriage 11 and the upper edge of the lower post portion 12a. The lift body 14 placed on the traveling carriage 11 is positioned within a space between the upper surface of the traveling carriage 11 and the upper end of the lower post portion 12a in the vertical direction. As a result, the level of the lower traveling portion 16a in the separated state separated from the upper traveling portion 16b and supporting the lift body 14 is lower than the predetermined level H.

Since the traveling body 16 is configured to allow the lower traveling portion 16a in the separated state to have the separation level L lower than the predetermined level H in this way, the lower traveling portion 16a in the separated state is movable through the underside of the platform 5, maintaining the traveling posture. More particularly, the traveling body 16 (lower traveling portion 16a) is moved in the width direction with the guided member 25 being guided by the floor rail 7 and with the traveling carriage 11 moving on the floor rail 7, thereby to allow the traveling body 16 (lower traveling portion 16a) to move to the underside of the platform 5, maintaining the traveling posture. In other words, the traveling body 16 (lower traveling portion 16a) is movable between the moving space S1 and the take-in/out space S2 through the underside of the platform 5 without detaching the platform 5.

When the lower traveling portion 16a is separated, the lifting belt 21 is detached from the post 12 by removing the opposite ends thereof from the lift body 14 to release the winding of the belt relative to the drive pulley 19 and the follower pulley 20. The upper traveling portion 16b separated from the lower traveling portion 16a is connected and supported to the ceiling side of the automated warehouse A using a connecting member (not shown).

A work carriage 28 is provided in the take-in/out space S2 to be movable on the floor. The work carriage 28 includes a carriage rail 29 for supporting and guiding the lower traveling portion 16a in the separated state. The work carriage 28 is provided in the take-in/out space S2 with the carriage rail 29 continuing from an end of the floor rail 7. The carriage rail 29 provided in the work carriage 28 has the same structure as the floor rail 7 and arranged in the same level as the floor rail 7. Thus, the work carriage 28 is moved to a loading/unloading position of the take-in/out space S2 to allow the carriage rail 29 to continue from the end of the floor rail 7, thereby to form a continued rail. More particularly, since the lower traveling portion 16a in the separated state is moved between the floor rail 7 and the carriage rail 29 to allow loading and unloading of the lower traveling portion 16a relative to the work carriage 28.

To be more specific, the traveling carriage 11 is moved with the traveling body 16 of the stacker crane 4 being separated into the lower traveling portion 16a and the upper traveling portion 16b, which allows the lower traveling portion 16a to be moved on the floor rail 7. Then, the work carriage 28 is moved to the take-in/out space S2 to allow the carriage rail 29 to continue from the floor rail 7, thereby to move the lower traveling portion 16a in the separated state to the one side of the moving space S1 in the width direction (first end side in the transverse direction) to be shifted from the floor rail 7 to the carriage rail 29. In other words, when the lower traveling portion 16a in the separated state is conveyed from the moving space S1 to the take-in/out space S2 acting as the taking out space, the conveyed lower traveling portion 16a in the separated state is moved on the work carriage 28. Therefore, when the work carriage 28 is moved to the place where the maintenance work is performed (workshop), the lower traveling portion 16a placed on the work carriage 28 is also moved to the workshop easily.

Next, the method of performing the maintenance work in the article storage system, in particular, for taking out the lower traveling portion 16a of the stacker crane 4 from the moving space S1 and performing the maintenance work for the lower traveling portion 16a and the lift body 14 in the outside of the automated warehouse A will be described hereinafter.

When the maintenance work relative to the lower traveling portion 16a and lift body 14 is performed in the outside of the automated warehouse A, the lower traveling portion 16a and the lift body 14 are taken out from the moving space S1 in the following procedure. As shown in FIG. 5, the opposite ends of the lifting belt 21 are removed from the lift body 14 with the lift body 14 being suspended by an unillustrated suspension device, the lifting belt 21 is pulled out from a post aperture 12c of the post 12 to be removed from the stacker crane 4, and then the lift body 14 is lowered to rest on the traveling carriage 11.

Then, as shown in FIG. 6, the upper traveling portion 16b is supported and suspended by the suspension device to separate the post 12 into the lower post portion 12a and the upper post portion 12b and separate the traveling body 16 into the lower traveling portion 16a and the upper traveling portion 16b to place the lower traveling portion 16a in the separated state. The upper traveling portion 16b supported and suspended by the suspension device is supportingly connected to the upper portion of the automated warehouse A.

Next, as shown in FIG. 6, the lower traveling portion 16a in the separated state that is separated from the upper traveling portion 16b for supporting the lift body 14 is guided by the floor rail 7 to move in the width direction, maintaining the traveling posture, and carried out from the moving space S1 to the take-in/out space S2. As noted above, the work carriage 28 is positioned in the loading/unloading position when the lower traveling portion 16a is carried out from the moving space S1 to the take-in/out space S2, which allows the lower traveling portion 16a to rest on the work carriage 28. The work carriage 28 loaded with the lower traveling portion 16a is moved to the workshop arranged in the outside of the moving space S1 to perform the maintenance work for the lower traveling portion 16a and the lift body 14 supported and placed on the lower traveling portion 16a.

It should be noted that the above-described procedure is reversed after the maintenance work is completed to put the lower traveling portion 16a in the separated state in the moving space S1 and connect the lower traveling portion 16a to the upper traveling portion 16b.

As noted above, the separation level L at which the traveling body 16 of the stacker crane 4 is separated into the lower traveling portion 16a and the upper traveling portion 16b is lower than the predetermined level H at which the platform 5 is mounted. Thus, the lower traveling portion 16a in the separated state that is separated from the upper traveling portion 16b to support the lift body 14 can be moved in the width direction with the traveling posture being maintained. As a result, the lower traveling portion 16a in the separated state can be moved from the moving space S1 to the take-in/out space S2 without detaching the platform 5.

Modified Embodiments

[1] The above description shows an example, in which the platform 5 acting as the attached apparatus 50 is provided for the operator to access the upper part of the moving space S1 from one side of the width direction. A transporting device for stock and delivery of the article relative to the automated warehouse A may be provide as the attached apparatus.

[2] The above description shows an example, in which the lower traveling portion 16a is configured to travel and move on the floor rail 7 for guiding the lower traveling portion 16a. Instead, the lower traveling portion 16a may be configured to move on the floor surface. Alternatively, the lower traveling portion 16a may be configured to move on another running rail provided separately from the floor rail 7 for guiding the lower traveling portion 16a.

[3] In the above description, the cable 26 is supported only by the lower post portion 12a. Instead, the cable 26 may be supported only by the upper post portion 12b or supported by both the lower post portion 12a and the upper post portion 12b.

[4] In the above description, the peripheral wall 9 surrounding the article storage shelves 2 and the moving space S1 is provided, but is dispensable instead. In that case, the taking in/out opening 9b for the stacker crane 4 is formed by the pair of article storage shelves 2 facing the platform 5 and the floor surface, while the access opening 9a for the operator is formed by the pair of article storage shelves 2 facing the platform 5 and the ceiling surface.

DESCRIPTION OF SIGNS 1 storage portion
2 article storage shelf
4 stacker crane
5 platform (attached apparatus)
7 floor rail
8 ceiling rail
11 traveling carriage
12 post
12a lower post portion
12b upper post portion
14 lift body
16 traveling body
16a lower traveling portion
16b upper traveling portion
26 cable
28 work carriage
29 carriage rail
50 attached apparatus
S1 moving space
S2 take-in/out space
H predetermined level

What is claimed is:

1. An article storage system comprising:
   an article storage shelf including a plurality of storage portions arranged in a vertical direction and a width direction;
   a stacker crane moving and traveling between a moving space defined between a pair of the article storage shelves facing each other for transporting an article; and
   an attached apparatus provided at a predetermined level adjacent to one side of the moving space in the width direction,
   wherein the stacker crane includes a traveling body having a traveling carriage guided by a floor rail laid on a floor to move and travel along the width direction and a post mounted upright on the traveling carriage, and a lift body supported and guided by the post to be vertically movable along the post,
   the lift body is configured to support a transfer device for transferring the article relative to the storage portion,
   the post has a dividable structure that is separable into a lower post portion and an upper post portion and connectable to each other at a level lower than the predetermined level,
   the traveling body is separable into a lower traveling portion and an upper traveling portion by separating the post into the lower post portion and the upper post portion, and
   the lower traveling portion in a separated state separated from the upper traveling portion and supporting the lift body is moved in the width direction with its traveling posture being maintained to be taken in or out between the moving space and a take-in/out space adjacent to the one side of the moving space in the width direction.

2. The article storage system as defined in claim 1, wherein the attached apparatus is a platform for the operator to access an upper part of the moving space from the one side of the moving space in the width direction.

3. The article storage system as defined in claim 2, wherein the traveling carriage is configured to move and travel on the floor rail, and the system further comprises a work carriage moving on the floor, the work carriage including a carriage rail for supporting and guiding the lower traveling portion in the separated state, and wherein the article storage system is configured to move the work carriage to the take-in/out space with the carriage rail continuing from an end of the floor rail to allow the lower traveling portion to move from the moving space to the take-in/out space.

4. The article storage system as defined in claim 3 further comprising a cable for power supply and information communication provided between the traveling carriage and the lift body and supported by the lower post portion.

5. The article storage system as defined in claim 2 further comprising a cable for power supply or information communication provided between the traveling carriage and the lift body and supported by the lower post portion.

6. The article storage system as defined in claim 1, wherein the traveling carriage is configured to move and travel on the floor rail, and the system further comprises a work carriage moving on the floor, the work carriage including a carriage rail for supporting and guiding the lower traveling portion in the separated state, and wherein the article storage system is configured to move the work carriage to the take-in/out space with the carriage rail continuing from an end of the floor rail to allow the lower traveling portion to move from the moving space to the take-in/out space.

7. The article storage system as defined in claim 6 further comprising a cable for power supply or information communication provided between the traveling carriage and the lift body and supported by the lower post portion.

8. The article storage system as defined in claim 1 further comprising a cable for power supply or information communication provided between the traveling carriage and the lift body and supported by the lower post portion.

9. A maintenance method for an article storage system comprising:
- an article storage shelf including a plurality of storage portions arranged in a vertical direction and a width direction;
- a stacker crane moving and traveling between a moving space defined between a pair of the article storage shelves facing each other for transporting an article; and
- an attached apparatus provided at a predetermined level adjacent to one side of the moving space in the width direction, the method comprising the steps of:
- constructing the stacker crane to include a traveling body having a traveling carriage guided by a floor rail laid on a floor to move and travel along the width direction and a post mounted upright on the traveling carriage, and a lift body supported and guided by the post to be vertically movable along the post,
- supporting a transfer device for transferring the article relative to the storage portion by the lift body,
- separating the post having a dividable structure that is separable into a lower post portion and an upper post portion and connectable to each other at a level lower than the predetermined level, thereby to separate the traveling body into a lower traveling portion and an upper traveling portion,
- moving the lower traveling portion in a separated state separated from the upper traveling portion and supporting the lift body in the width direction with its traveling posture being maintained to be carried out from the moving space to a take-in/out space adjacent to the one side of the moving space in the width direction, and
- performing maintenance work for the lower traveling body and the lift body in the outside of the moving space.

* * * * *